Patented Oct. 26, 1943

2,332,735

UNITED STATES PATENT OFFICE 2,332,735

BEVERAGE PREPARATION AND METHOD OF MAKING THE SAME

Frank H. Lyons, Memphis, Tenn., assignor to Clyde Collins Incorporated, Memphis, Tenn., a corporation of Tennessee No Drawing. Application April 30, 1941, Serial No. 391,097

14 Claims. (Cl. 99—78)

This invention relates to improvements in beverage preparations of the fruit acid type and to methods of making the same. More particularly the invention relates to beverage preparations of the type described which are adapted to be prepared and marketed in a substantially dry powdered state and are capable of being dissolved or dispersed in water at the time of consumption to provide a palatable and easily prepared beverage.

In the past, beverage mixtures of the above type have been made by mixing a fruit acid, such as tartaric acid, with anhydrous sugar and suitable flavoring and/or coloring matter. The resulting mixtures were usually packaged and sold in small paper envelopes, generally containing only enough of the beverage mixture for the preparation of one or two quarts of beverage, primarily because this method of packaging is inexpensive, involves low shipping costs, and is very convenient for the consumer. However, dry packaged mixtures such as the above have enjoyed only a very limited use on a commercial scale, as they tend to deteriorate quickly, particularly in hot or humid climates. Thus, they tend to become hard and caked and not only are difficult to remove from the package, but render the package unsightly and in general unsalable.

It is accordingly a primary object of the present invention to provide a substantially dry beverage preparation of the character indicated which may be readily packaged for distribution in small quantities and is sufficiently stable not to deteriorate during storage or the normal necessary period for distribution and sale.

Other objects and advantages of the invention will appear from the following description and appended claims.

The objects of the invention are in general attained by admixing with the fruit acid constituting the acidulating ingredient of the beverage a suitable amount of an edible, essentially non-hygroscopic and relatively water-insoluble acid phosphate, such as monocalcium phosphate. The acid phosphate may be added in widely differing proportions with an entirely satisfactory effect. For example, it is possible to add anywhere from about .5 to 2.5 parts by weight of acid phosphate for each part by weight of fruit acid. However, it is preferable to use at least 1.75 parts by weight of the phosphate for each part by weight of fruit acid, particularly when the mixture is to be packaged in small quantities.

The fruit acids which may be used or treated in accordance with this invention include such acids as tartaric, citric, and malic acids, or mixtures of these acids. However, it is possible to employ any water-soluble edible fruit acid, or the acid salts of such acids. These acids and salts are generally very hygroscopic, and tend to cause undesirable caking and hardening in ordinary beverage preparations containing them. However, when they are mixed with acid phosphates of the type described herein, an entirely stable drink mixture is obtained which is readily soluble or dispersible in water to furnish a palatable and tasty drink.

Small proportions of coloring and flavoring substances may be added to the beverage mixtures, if desired. Moreover, it is frequently desirable to mix a small amount of mineral oil with the fruit acid prior to admixing the acid phosphate, as this speeds up the mixing time and produces a desirable cloud in the beverage prepared from the resulting mixture. The addition of mineral oil is not essential, however, as thoroughly stable products of satisfactory appearance and taste can be obtained either with or without its use.

In preparing the beverage preparations of this invention a variety of methods may be used. For example, when mineral oil is used, it is usually preferable to first mix the fruit acid therewith, thereby forming a coating or film of oil upon the acid particles. This initial coating of oil facilitates the mixing of the fruit acid and the acid phosphate, which is subsequently added, i. e. facilitates the coating of the fruit acid particles with the acid phosphate particles. It is also frequently desirable, whether mineral oil is used or not, to supply the acid phosphate in both powdered and granulated or spray dried form, and to first mix a portion of powdered phosphate with the acid, after which a portion of granulated phosphate is added. By proceeding in this way, it is possible to more readily subdivide the mass into small portions suitable for packaging, and the mechanical handling in general of the mixture is greatly facilitated. It should be understood, however, that the beneficial effects of this invention are not dependent upon the above methods of mixing, and that entirely satisfactory results may be obtained by mixing the various ingredients in any order, simultaneously, or in any other suitable manner.

A more complete understanding of the invention will be obtained from the following examples of mixtures and methods of mixing the same:

Example I 130 pounds of tartaric acid were thoroughly mixed with 1½ pounds of mineral oil for about one minute in a mixer of the type known as a Day mixer. 100 pounds of powdered monocalcium phosphate were then added to the mixture in the mixer, after which the mixing was continued for about three-quarters of a minute. Following this 162 pounds of granulated monocalcium phosphate were added, the mixing being continued for about one-half minute, and finally 4 pounds of certified food color and 2 pounds of flavoring were added, the mixer again being operated for about one minute. The resulting mixture was then packed in small envelopes in amounts varying from 1/16 to 1 ounce, and after two weeks was found to be just as stable and just as salable as when made.

Example II 130 pounds of tartaric acid were mixed for about two minutes with 100 pounds of powdered monocalcium phosphate. Then 150 pounds of granulated monocalcium phosphate were added to the resulting mixture, and mixed for about one minute, after which 3 pounds of food color and 2 pounds of flavoring were added, while continuing the mixing. The resulting mixture did not deteriorate when kept for long periods in paper containers, could be readily dissolved in water, and was otherwise suitable for making a palatable drink or beverage.

Example III 150 pounds of anhydrous citric acid were mixed for about three minutes with 325 pounds of powdered monocalcium phosphate. Five pounds of food color and 3 pounds of flavoring were then added, and the resulting mixture mixed for about one minute. The mixture was then ready for packaging, and remained in substantially the same condition as when initially prepared, even when it was stored for a considerable period of time.

Example IV

A beverage mixture containing anhydrous citric acid, mineral oil, powdered and granulated monocalcium phosphate, food color and flavoring in the proportions given in Example I was prepared in the same manner as therein described. The resulting mixture was equally as stable as the product of Example I, and could be readily divided into small portions and packed in paper envelopes.

Example V

A beverage mixture containing malic acid, monocalcium phosphate, food color and flavoring in the proportions given in Example III was prepared in the same manner as described in said example. The resulting mixture was thoroughly stable and did not deteriorate when stored for a long period.

By proceeding in the manner described above and in the examples it is possible to provide beverage preparations or mixtures which may be readily divided into small portions and packaged in paper envelopes. Moreover, the resulting packaged products do not deteriorate during distribution or storage, and retain their initial appearance and salability over periods of weeks and months. When mineral oil is used, it is introduced to coat the fruit acid, causing the monocalcium or other acid phosphate to adhere thereto, thereby further reducing the possibility of changes due to the hygroscopicity of any ingredient of the mixture. The oil also produces a cloud in the beverage upon dissolution, thus adding to its appeal.

Monocalcium phosphate, which is a relatively nonhygroscopic substance and will not extract appreciable moisture from the atmosphere, is the preferred acid phosphate for the purposes of this invention due to its relative cheapness and availability, and to the fact that it is capable of imparting sufficient sourness to the beverage, in conjunction with the fruit acid, to adapt the preparation for use in small quantities. However, other essentially non-hygroscopic edible acid substances, and particularly acid phosphates, capable of inhibiting the absorption of atmospheric moisture and hence stabilizing relatively hygroscopic mixtures, may be employed, if desired, particularly when their acid characteristics are such as to impart adequate sourness to the beverage prepared therefrom. By using the acid phosphate, or like acid substance, in both a powdered and granulated condition, the mechanical handling of the mixture, including its subdivision into relatively small portions, is greatly facilitated, because caking of the mixture is further prevented.

The beverage preparations prepared according to this invention are generally used by adding a suitable quantity thereof to water and sweetening to taste. When employed in this manner they provide a thoroughly palatable and tasty non-alcoholic beverage. They may be used in other ways, however, for example with carbonated water, and it is also contemplated admixing sugar with them during their preparation, thereby avoiding the necessity of sweetening after dissolution.

Where it is desired to provide a preparation of the character indicated to be sold in relatively larger quantities, an even more stable preparation may be provided by thoroughly mixing together 196 pounds of powdered monocalcium phosphate, 196 pounds of potassium bitartrate, 4 pounds of certified food color and 2 pounds of flavoring material. To this also may be added 1½ pounds of mineral oil if desired. Such a mixture would be found to be considerably more stable than the mixtures above set forth but lacks sufficient acid characteristics to adapt it to use where it is desired to distribute the preparation in relatively small quantities at relatively low price.

While I have set forth in detail the preferred ingredients and proportions thereof, these are capable of variation and modification without departing from the spirit of the invention. I therefore do not wish to be limited to the precise details set forth but desire to avail myself of such variations and modifications as fall within the scope of the appended claims.

This application is a continuation-in-part of application Serial No. 200,911 filed April 8, 1938.

I claim:

1. A dry, water-soluble, substantially stable and non-hygroscopic beverage-forming mixture comprising materials mixed together in proportions substantially as follows: powdered monocalcium phosphate, 100 pounds; granulated monocalcium phosphate, 162 pounds; tartaric acid, 130 pounds; mineral oil, 1½ pounds; food color, 4 pounds; flavoring material, 2 pounds.

2. The method of making a dry, water-soluble, substantially stable and non-hygroscopic beverage-forming mixture which consists in first mixing together an acid substance selected from the group consisting of citric, tartaric and malic acids and their acid salts, and a mineral oil, and then adding an edible, essentially non-hygroscopic and water-insoluble acid phosphate and flavoring material.

3. The method of making a dry, water-soluble substantially stable and non-hygroscopic beverage-forming mixture which consists in first mixing together tartaric acid and a mineral oil, and then adding monocalcium phosphate and flavoring material.

4. The method of making a dry, water-soluble, substantially stable and non-hygroscopic beverage-forming mixture which consists in first mixing together tartaric acid and a mineral oil, and then adding powdered monocalcium phosphate, granulated monocalcium phosphate and flavoring material.

5. The method of making a dry, water-soluble, substantially stable and non-hygroscopic beverage-forming mixture which consists in first mixing together 130 pounds of tartaric acid and 1½ pounds of mineral oil, then adding powdered monocalcium phosphate to the mixture in the proportion of 100 pounds, then adding granulated monocalcium phosphate to the mixture in the proportion of 162 pounds, and then adding food color and flavoring material to the mixture.

6. A dry, water-soluble beverage-forming mixture, which is substantially non-hygroscopic and stable in a paper container under summer atmospheric conditions, comprising an acid substance selected from the group consisting of citric, tartaric and malic acids and their acid salts, and monocalcium phosphate, said acid substance and said phosphate together being capable of imparting a relatively mild, tart taste to the beverage prepared therefrom.

7. A dry, water-soluble, substantially non-hygroscopic and stable beverage-forming mixture comprising an acid substance selected from the group consisting of citric, tartaric and malic acids and their acid salts, and an edible, essentially non-hygroscopic and relatively water-insoluble acid phosphate, said acid substance and said phosphate together being capable of imparting a relatively mild, tart taste to the beverage prepared therefrom.

8. A dry, water-soluble and substantially non-hygroscopic and stable beverage-forming mixture comprising tartaric acid and monocalcium phosphate, said acid and said phosphate together being capable of imparting a relatively mild, tart taste to the beverage prepared therefrom.

9. A dry, water-soluble and substantially non-hygroscopic and stable beverage-forming mixture comprising potassium bitartrate and monocalcium phosphate, said bitartrate and said phosphate together being capable of imparting a relatively mild, tart taste to the beverage prepared therefrom.

10. A dry, water-soluble and substantially non-hygroscopic and stable beverage-forming mixture comprising an acid substance selected from the group consisting of citric, tartaric and malic acids and their acid salts, and an edible, substantially non-hygroscopic and relatively water-insoluble acid phosphate, the separate particles of said acid substance being coated with the separate particles of said phosphate, said acid substance and said phosphate together being capable of imparting a relatively mild, tart taste to the beverage prepared therefrom.

11. A dry, water-soluble and substantially non-hygroscopic and stable beverage-forming mixture comprising an acid substance selected from the group consisting of citric, tartaric and malic acids and their acid salts, the individual particles of which have been coated with a relatively large proportion of monocalcium phosphate and a relatively small proportion of mineral oil, said acid and said phosphate together being capable of imparting a relatively mild, tart taste, to the beverage prepared therefrom.

12. A dry, water-soluble, substantially non-hygroscopic and stable beverage-forming mixture comprising anhydrous citric acid and an edible, essentially non-hygroscopic and relatively water-insoluble acid phosphate, said acid and said phosphate together being capable of imparting a relatively mild, tart taste to the beverage prepared therefrom.

13. A dry, water-soluble, substantially non-hygroscopic and stable beverage-forming mixture comprising anhydrous citric acid and monocalcium phosphate, said acid and said phosphate together being capable of imparting a relatively mild, tart taste to the beverage prepared therefrom.

14. A dry, water-soluble and substantially non-hygroscopic and stable beverage-forming mixture comprising anhydrous citric acid, the individual particles of which have been coated with a relatively large proportion of monocalcium phosphate and a relatively small proportion of mineral oil, said acid and said phosphate together being capable of imparting a mild, tart taste to the beverage prepared therefrom.

FRANK H. LYONS.